United States Patent
Flock, Jr. et al.

[15] 3,655,552

[45] Apr. 11, 1972

[54] METHOD FOR REMOVING PHOSPHATE FROM WASTE WATER

[72] Inventors: Howard George Flock, Jr., Bethel Park; Emerson George Rausch, Corapolis, both of Pa.

[73] Assignee: Calgon Corporation, Pittsburgh, Pa.

[22] Filed: Feb. 16, 1971

[21] Appl. No.: 115,850

[52] U.S. Cl. ................................210/47, 252/181
[51] Int. Cl. .........................................C02b 1/20
[58] Field of Search ..........................210/52–54, 47; 252/181

[56] References Cited

UNITED STATES PATENTS

| | | | |
|---|---|---|---|
| 3,488,717 | 1/1970 | Wukasch et al. | 210/53 |
| 3,171,804 | 3/1965 | Rice | 210/53 |
| 3,461,067 | 8/1969 | Matsumoto et al. | 210/53 X |
| 3,232,793 | 2/1966 | Bourne et al. | 210/53 X |
| 3,506,570 | 4/1970 | Wukasch | 210/53 X |

FOREIGN PATENTS OR APPLICATIONS

| | | | |
|---|---|---|---|
| 805,526 | 12/1958 | Great Britain | 210/52 |
| 607,440 | 10/1960 | Canada | 210/53 |

*Primary Examiner*—Michael Rogers
*Attorney*—William L. Krayer and Herbert J. Zeh, Jr.

[57] ABSTRACT

Phosphate is removed from municipal and industrial waste water by treating the water with a synergistic admixture of a water-soluble high molecular weight nonionic polymer, preferably polyacrylamide, and a water-soluble salt containing ferric ions, preferably ferric chloride.

6 Claims, No Drawings

METHOD FOR REMOVING PHOSPHATE FROM WASTE WATER

BACKGROUND OF THE INVENTION

This invention is directed to the treatment of water to remove phosphate. More particularly, this invention is directed to the use of a synergistic admixture of a water-soluble high molecular weight nonionic polymer and a water-soluble salt containing ferric ions to remove phosphate from water, especially municipal and industrial wastes.

Phosphate pollution is a major problem confronting our water resources. In fact, one of the major problems in a well-run water pollution control program is phosphate removal. If the phosphate could be removed from the waste water, then in all probability, the algae growth would be controlled and one of the problems preventing reuse of treated waste water would be solved. It is, therefore, the object of this invention to remove phosphate from water.

In the past, the most frequently employed method for removing phosphate has been precipitation with metal salts. Alum, lime, iron, calcium, zinc, and many other common metals form relatively insoluble precipitates with phosphates which may be removed by filtration or sedimentation. However, in order to remove most of the phosphate in this manner, a very high treatment level is necessary which is usually impractical and the cost excessive. Moreover, this process generally causes undesirable changes in the water being treated. In addition, the metal phosphate precipitates are slow forming and fragile.

More recently, high molecular weight, water-soluble, nonionic and anionic polymers have been used in conjunction with the metal salts to remove phosphate. This combination treatment is generally carried out by treating the water with the metal and then, after a short interval, following this up by treating with the polymer. This method is an improvement over the use of the metal alone and has found commercial success. For examples of some more recent methods see Eck et al., U.S. Pat. No. 3,453,207, which is directed to the removal of phosphate using a synergistic combination of alum and a cationic organic latex. See, also, Eck et al., U.S. Pat. No. 3,456,796, which discloses the use of a synergistic combination of alum and a cationic or anionic dispersion to remove phosphate. While most of these combination treatments are commercially feasible, new and improved processes are always desirable from an economic standpoint.

SUMMARY OF THE INVENTION

We have found that the removal of phosphates from municipal and industrial waste waters may be accomplished by treating the waste water with a synergistic admixture of a water-soluble, high molecular weight, nonionic polymer and a water-soluble salt containing ferric ions. The method of removing phosphate according to our invention is an improvement over the prior art methods.

The term "phosphate removal" as used herein means the removal of both dissolved and suspended phosphate. The term means the removal of the total phosphate present in the water being treated. As is realized by one skilled in the art, most of the suspended phosphate can be removed by an efficient filtration or sedimentation step. However, most commercial processes do not remove all of the phosphates and to modify these conventional processes to remove all the phosphates would be uneconomical. The method of our invention increases the removal of suspended phosphates by conventional filtration or sedimentation techniques. However, the primary application of the method of our invention is the removal of phosphate ion (dissolved phosphate). Dissolved phosphate is by far the more difficult to remove and the more deleterious to the environment. The method of our invention is primarily directed to the removal of dissolved phosphate.

Our method of removing phosphate comprises treating the waste water with from 0.5 to 3.0 p.p.m. of the polymer/iron salt admixture for every 1 p.p.m. of dissolved phosphate present. The admixture is comprised of from 0.01 to 10 percent by weight polymer and the remainder is the iron containing salt. Preferably, for economic and mechanical reasons, the admixture is comprised of from 0.1 to 2 percent by weight polymer and the remainder the iron salt.

It is a critical step in the method of our invention that the iron salt and polymer are physically blended into a liquid admixture before they are added to the waste water. This physical blending may be accomplished by forming a dry admixture of the two components which is dissolved prior to using to form a solution having the desired amounts of polymer and iron salt. The physical blend may also be a concentrated aqueous solution of a polymer/iron salt admixture which is simply diluted to the desired solution strength before using. One may also prepare a solution of the polymer and a solution of the iron salt and mix these two solutions together in the desired ratio before adding them to the waste water. There are also other ways of preparing and using the physical blend of the polymer/iron containing salt which are apparent to the skilled artisan. The important factor is that the polymer and iron containing salt are physically blended into an aqueous solution in the desired ratio before addition to the waste stream.

As mentioned supra, the polymer of our invention is a water-soluble high molecular weight nonionic polyacrylamide. To date, however, it is extremely difficult to prepare a high molecular weight polyacrylamide that does not contain even a low percentage of carboxylic groups. Therefore, by a "nonionic polyacrylamide," we mean to include polyacrylamides that contain a small amount of carboxylic groups. We prefer a completely nonionic polyacrylamide but out invention is functional with polyacrylamides containing 2 or 3 percent carboxylic groups. In addition, the polyacrylamide of our invention does not have to be a homopolymer of acrylamide. The term "nonionic polyacrylamide" as used herein, therefore, includes copolymers of acrylamide and up to about 25 percent of other nonionic comonomers. Some of the nonionic comonomers are diacetone acrylamide, hydroxy ethyl acrylate, hydroxy ethyl methacrylate, polyethyleneoxide, n-substituted acrylamides and methacrylamides. It is also within the scope of this invention to use polyacrylamides containing up to about 5 percent of a cationic comonomer. Some useful cationic comonomers are the dialkyl diallyl ammonium chlorides and 2-hydroxy 3 methacryl-oxypropyl trimethyl ammonium chloride. The term "nonionic polyacrylamide" includes copolymers of acrylamide and up to about 5 percent by weight of a cationic comonomer. While higher levels of cationic comonomers are compatible with the iron containing salts, we prefer not to use them. The preferred comonomer is diacetone acrylamide. In fact, we have found that copolymers containing as much as 50 percent by weight diacetone acrylamide work very well in our invention. We therefore include in the definition of polyacrylamide as used herein polymers containing up to 50 percent by weight diacetone acrylamide.

There is no limitation on the molecular weight of a polymer which will work in our invention. A low molecular weight polymer is effective in so far as it removes phosphate to a certain degree. However, as compared to a high molecular weight polymer, the low molecular weight polymer is ineffective. Generally speaking, the higher the molecular weight the polymer, the more effective it is in our invention. Therefore, by "high molecular weight polymer," we mean a polymer with a molecular weight of 1 million or greater. We prefer molecular weights of ten to twenty million or higher.

The iron conditioning agent of our invention is a water-soluble ferric containing salt. We have found that any water-soluble salt which yields this ion in solution will work in our invention. Some of the useful ferric salts are ferric nitrate, ferric sulfate, ferric chloride, ferric oxalate, ferric ammonium oxalate, ferric formate, ferric lactate, and ferric bromide. However, we have found that ferric chloride and ferric sulfate are preferred. Among the preferred compounds, ferric chloride is the more preferred. It is also within the scope of this invention to utilize a combination of one or more different ferric salts. The important limitation is the presence of ferric ions.

The removal of phosphate in accordance with our invention is carried out by adding the synergistic combination of the polymer/iron salt to the waste water with agitation during and/or immediately after the addition. Then, the waste water is agitated for several additional minutes, if desired. After termination of the agitation, a precipitate of the phosphate forms and is removed by any conventional method such as filtration, sedimentation, decantation and the like.

The following examples serve to illustrate the efficacy of our invention but should not be deemed to limit the invention.

EXAMPLE 1

A series of jar tests was run to compare the performance of ferric chloride versus a ferric chloride polymer admixture for phosphate removal. The tests were performed on samples of the primary effluent from a mideastern municipal sewage plant using variable speed multiple stirrers and 1,000 milliliter beakers. Each test was performed by adding the treating reagents as quickly as possible to waste water while stirring the water at 100 r.p.m. After the chemicals were added, the treated waste water was agitated in the following sequence: 3 minutes at 100 r.p.m. 5 minutes at 50 r.p.m. 10 minutes at 10 r.p.m. and 5 minutes at 0 r.p.m. After the 5 minutes at 0 r.p.m. the supernate was decanted and analyzed for dissolved and total phosphate. All of the phosphate determinations were made using the procedure found in Standard Methods, 12 Edition, 1965.

Table 1 illustrates the results for the jar tests from Example 1.

TABLE 1

| Sample | ppm FeCl$_3$ solution | ppm polymer | Phosphate in Supernate Total in mg./l. | Dissolved in mg./l. |
| --- | --- | --- | --- | --- |
| 1 | 0 | 0 | 21.6 | 18.6 |
| 2 | 5 | 0 | 19.7 | 15.4 |
| 3 | 10 | 0 | 16.9 | 13.4 |
| 4 | 15 | 0 | 15.1 | 11.7 |
| 5 | 20 | 0 | 13.7 | 10.5 |
| 6 | 25 | 0 | 14.5 | 9.3 |
| 7 | 30 | 0 | 13.4 | 8.0 |
| 8 | 4.975 | 0.025 | 18.0 | 15.4 |
| 9 | 9.95 | 0.05 | 15.4 | 12.7 |
| 10 | 14.925 | 0.075 | 13.1 | 10.8 |
| 11 | 19.9 | 0.1 | 10.6 | 8.6 |
| 12 | 24.875 | 0.125 | 7.9 | 7.0 |
| 13 | 29.85 | 0.15 | 6.1 | 5.0 |

The primary effluent used in this series of jar tests had 23.0 milligrams/liter of total phosphate and 19.0 milligrams/liter of dissolved phosphate. In the above table and all tables herein, all p.p.m. are parts per million on a weight basis (total weight of waste water). The polymer was a water-soluble high molecular weight nonionic homopolymer of acrylamide and the ferric chloride solution was 44.62 percent by weight ferric chloride. In sample numbers 8 to 13 the polymer and ferric chloride were blended into a homogenous solution which was then added to the waste water. The blended solution was 44.62 percent ferric chloride and 0.5 percent polymer.

The results in Table 1 clearly illustrate the effectiveness of using the admixture of our invention in removing both total phosphate and dissolved phosphate.

EXAMPLE 2

Another series of jar tests was run to compare the performance of the addition of a polymer/iron salt admixture versus the separate additions of polymer first and iron salt second and the addition of iron salt first and polymer second for the removal of phosphate from primary effluent waste water. The following time and speed sequences were followed in running the jar tests: 3 minutes at 100 r.p.m. 3 minutes at 50 r.p.m. 5 minutes at 10 r.p.m. and 5 minutes at 0 r.p.m. On the separate additions, the first aliquot, either the polymer or iron salt was added. The waste water was then stirred at 100 r.p.m. for 2.0 minutes. Then the second aliquot of either the polymer or iron salt was added and the solution stirred for 1.0 minute at 100 r.p.m. The speed was then reduced to 50 r.p.m. and the above stirring sequence followed. The waste water used for this series was the primary effluent from a mideastern domestic sewage plant which handled domestic sewage and light industrial waste water. The results are shown in Table 2.

TABLE 2

| Sample: Primary effluent | Total PO$_4$ (dissolved and suspended) | | 13.20 mg/l |
| --- | --- | --- | --- |
| | Total Filtered PO$_4$ (dissolved) | | 11.50 mg/l |

| Chemicals mg/l FeCl$_3$ + % polymer (by wt. of FeCl$_3$) | Total PO$_4$ mg/l—Dissolved + suspended After treatment | | |
| --- | --- | --- | --- |
| | Admixture | Polymer first | Polymer second |
| 10 mg/l + 0.10% polymer | 10.30 | 11.80 | 11.80 |
| 10 mg/l + 0.50% polymer | 10.30 | 12.64 | 12.64 |
| 10 mg/l + 1.00% polymer | 10.90 | 12.36 | 11.80 |
| 15 mg/l + 0.10% polymer | 7.66 | 12.64 | 9.54 |
| 15 mg/l + 0.50% polymer | 7.80 | 10.46 | 8.54 |
| 15 mg/l + 1.00% polymer | 7.66 | 12.64 | 9.40 |
| 20 mg/l + 0.10% polymer | 6.34 | 10.00 | 8.40 |
| 20 mg/l + 0.50% polymer | 6.20 | 9.54 | 8.40 |
| 20 mg/l + 1.00% polymer | 6.80 | 9.70 | 8.54 |

The results shown in Table 2 clearly illustrate the improvement of using the admixture over the use of the polymer and iron salt as separate additions.

EXAMPLE 3

A series of jar tests was run to evaluate the effectiveness of an admixture of ferric chloride and high molecular weight polyacrylamide versus ferric chloride alone and versus separate additions of ferric chloride and polymer, adding ferric chloride first. The following tables summarize the chemicals added and the results for remaining phosphate after chemical treatment. All of the admixtures of ferric chloride and polymer used in this series were prepared to give a final product containing 100 grams/liter of ferric chloride, plus a varying percentage of polymer based on the weight ferric chloride. The following time and speed sequences were followed: 3 minutes at 100 r.p.m. 5 minutes at 50 r.p.m. 10 minutes at 10 r.p.m. and 5 minutes at 0 r.p.m. The following tables illustrate the results of this series.

TABLE 3

| Sample: Primary effluent | Total PO$_4$ (dissolved and suspended) | 23.0 mg/l |
| --- | --- | --- |
| | Total Filtered PO$_4$ (dissolved) | 19.0 mg/l |
| Control (no chemicals) | Total PO$_4$ (dissolved and suspended) | 21.6 mg/l |
| | Total Filtered PO$_4$ (dissolved) | 18.6 mg/l |

| mg/l treatment | Total PO$_4$ mg/l after treatment (dissolved and suspended) | | Filtered total PO$_4$ mg/l after treatment (dissolved) | |
| --- | --- | --- | --- | --- |
| | FeCl$_3$ | FeCl$_3$ + 0.5% polymer | FeCl$_3$ | FeCl$_3$ + 0.5% polymer |
| 5 | 19.7 | 18.0 | 15.4 | 15.4 |

| | | | | |
|---|---|---|---|---|
| 10 | 16.9 | 15.4 | 13.4 | 12.7 |
| 15 | 15.1 | 13.1 | 11.7 | 10.8 |
| 20 | 13.7 | 10.6 | 10.5 | 8.6 |
| 25 | 14.5 | 7.9 | 9.3 | 7.0 |
| 30 | 13.4 | 6.1 | 8.0 | 5.0 |

The results in Table 3 clearly show that the admixture removes more phosphate than ferric chloride over the entire treatment range. The waste water used for this table was the primary effluent from a mideastern domestic sewage plant.

TABLE 4

| Sample: Primary effluent | | | Total $PO_4$ (dissolved and suspended) | 12.08 |
|---|---|---|---|---|
| | | | Total Filtered $PO_4$ (dissolved) | 10.90 |
| Control (no chemicals) | | | Total $PO_4$ (dissolved and suspended) | 10.90 |
| | | | Total Filtered $PO_4$ (dissolved) | 10.00 |
| 30 mg/l $FeCl_3$ | | | Total $PO_4$ (dissolved and suspended) | 2.64 |
| | | | Total Filtered $PO_4$ (dissolved) | 1.80 |

| Chemicals mg/l $FeCl_3$ + % (by wt. of $FeCl_3$) polymer | Total $PO_4$ mg/l after treatment (dissolved and suspended) | | Filtered total $PO_4$ mg/l after treatment (dissolved) | |
|---|---|---|---|---|
| | Admixture | $FeCl_3$ first Polymer second | Admixture | $FeCl_3$ first Polymer second |
| 30 mg/l + 0.5% polymer | 2.00 | 2.36 | 0.78 | 1.03 |
| 30 mg/l + 1.0% polymer | 1.58 | 1.98 | 0.70 | 0.75 |
| 30 mg/l + 1.25% polymer | 1.28 | — | 0.46 | — |
| 30 mg/l + 1.5% polymer | 1.20 | 4.84 | 0.41 | 1.18 |

The series shown in Table 4 was run to compare the performance of the admixture versus separate additions. Only the separate addition of ferric chloride first, polymer second was tested because it was discovered that this separate addition gave better results than the addition of polymer first. Therefore, if the admixture removed more phosphate than this type of separate addition, it would remove more phosphate than separate addition with polymer addition first. When using the separate additions, the ferric chloride was added and the solution stirred for 30 seconds at 100 r.p.m. then the polymer was added and the solution stirred for 2.5 minutes at 100 r.p.m. The speed was then reduced to 50 r.p.m. and the remaining stirring sequence observed. The results in Table 4 show that all of the admixtures tested definitely remove more phosphate than any of the separate additions of ferric chloride and polymer.

We claim:

1. A method for removing phosphate from water comprising:
   a. first forming an aqueous blend of a water-soluble, high molecular weight polymer consisting essentially of nonionic polyacrylamide containing not more than about three percent carboxyl groups and a water-soluble iron containing salt and
   b. thereafter treating the water with from 0.5 to 3.0 p.p.m. of the liquid blend for every 1 p.p.m. of dissolved phosphate present in the water.

2. A method as in claim 1 wherein the polymer is a homopolymer of acrylamide.

3. A method as in claim 1 wherein the iron containing salt is selected from ferric sulfate and ferric chloride.

4. A method as in claim 2 wherein the iron containing salt is selected from ferric sulfate and ferric chloride.

5. A method for removing phosphate from water comprising:
   a. first forming an aqueous blend of a water-soluble, high molecular weight polymer consisting essentially of nonionic polyacrylamide containing not more than about three percent carboxyl groups and a water-soluble, iron containing salt where the liquid blend, exclusive of water, consists essentially of from 0.01 to 2.0 percent by weight of the polymer and the remainder the water-soluble, iron containing salt; and
   b. thereafter treating the water with from 0.5 to 3.0 p.p.m. of the liquid blend for every 1 p.p.m. of dissolved phosphate present in the water.

6. A method as in claim 5 wherein the polymer is a homopolymer of acrylamide and wherein the iron containing salt is ferric chloride.

* * * * *